Oct. 20, 1953
F. C. FANTZ
2,656,143
FLEXIBLE GATE VALVE
Filed Nov. 13, 1951
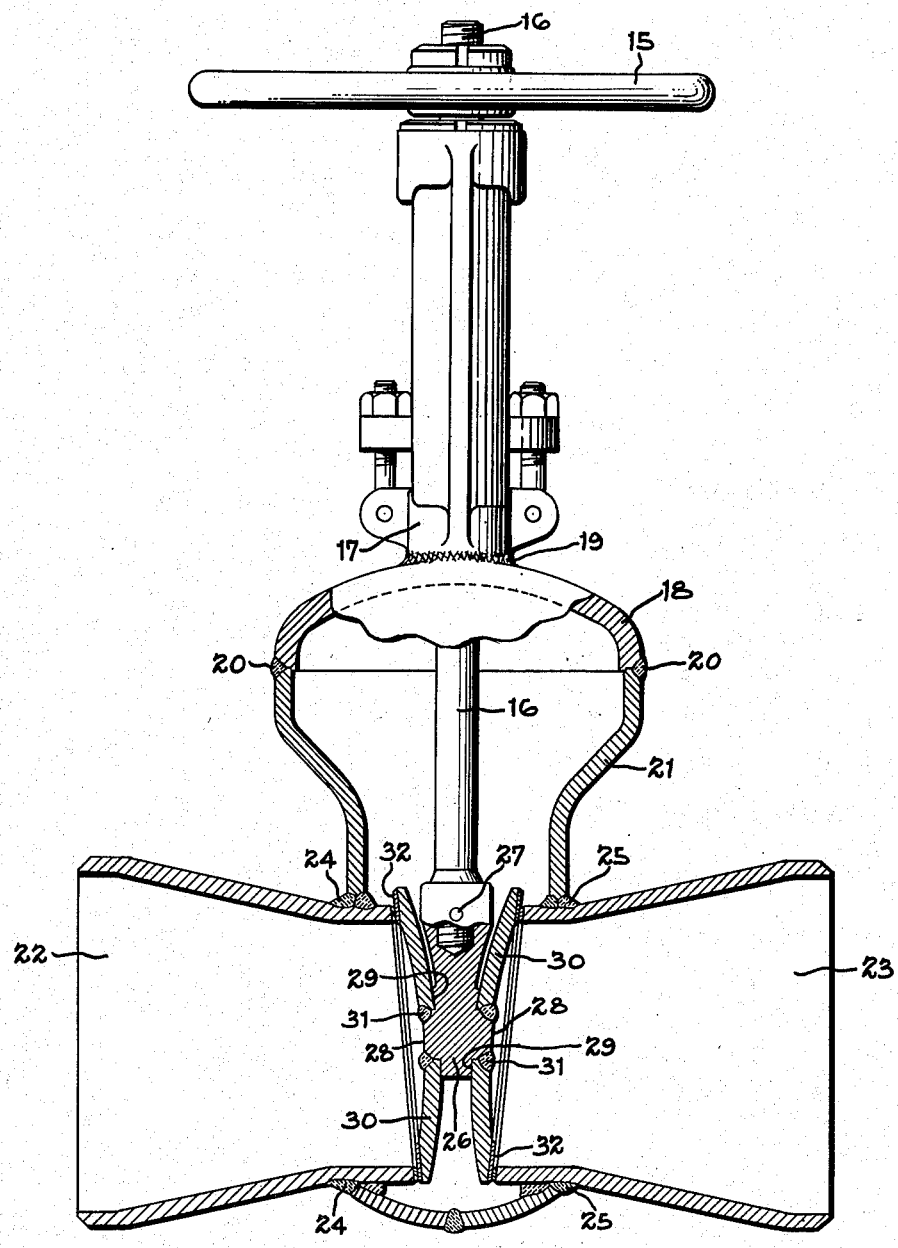
INVENTOR.
Fred C. Fantz.
BY
Wood, Herron & Evans.
ATTORNEYS.

Patented Oct. 20, 1953

2,656,143

UNITED STATES PATENT OFFICE 2,656,143

FLEXIBLE GATE VALVE

Fred C. Fantz, Lima, Ohio, assignor, by mesne assignments, to The Lunkenheimer Company, Cincinnati, Ohio, a corporation of Ohio Application November 13, 1951, Serial No. 255,925

2 Claims. (Cl. 251—59)

1

This invention relates to valve gates in which sections of metal are employed which may be relatively thin in relation to the pressures and temperatures served by the valves. This invention is a continuation in part of my co-pending patent application, Serial No. 713,878, filed December 4, 1946, entitled "Flexible Valve Gate," which is now abandoned.

Valves which are utilized in piping for fluids of high temperature or pressure are subject to structural deformations during prolonged use, as a result of metal warpage, gradual relief of initial stresses, metal creepage, or the physical strain to which metal sections in the valves are subjected in the piping installation. Deformations of the metal of the valve causes misalignment of the valve seat and its mating gate, regardless of how accurately they were machined or ground to fit initially. Since gate valves of the type to which the invention relates are frequently used to control the flow of fluids which are at very high temperature, or under very high pressure, or both, it is apparent that the valve gates must close perfectly, and that not even the slightest leakage can be tolerated.

The present invention solves the problem just discussed by providing a novel all-metal valve gate which is highly rigid in relation to the line pressures encountered but which is sufficiently flexible when subjected to the valve closing pressure to yield sufficiently to compensate for any valve seat misalignment or warpage which may develop during the period of usage of the valve. The said flexibility or yieldability or resiliency of the gate is a function of the physical structure of the gate and, hence, does not require the utilization of any particularly novel metal alloy. In fact, gate valves may be fabricated in accordance with this invention from any desired type of metal provided the metal has the rigidity and durability requisite to withstand the pressure and/or temperature encountered by the valve in service, and is not so brittle as to crack when flexed to the degree requisite to compensate for misalignment of the valve seats.

Preferably, the gate valve structure is such that flexing metal deformation, which may occur in the valve closing, takes place in those portions of the valve gate which were intended and constructed to flex. Further, the structure of the valve gate is such that the intended yieldability is uniformly available over the entire area which engages the valve seats, whereby maximum accommodation of dimensional variation is accomplished.

2

Other objects and further advantages will be better understood in relation to a description of the drawings in which:

Figure 1 is a fragmentary sectional elevation through the body portion of a gate valve having a valve gate constructed in accordance with the present invention. Since the details of the valve screw, packing, handwheel, and the like may be of conventional design and form no part of the present invention, such details have been omitted from the drawing.

The structure shown in the drawing comprises a hand wheel 15 which is mounted at the top of the valve in a conventional manner so that rotation of the hand wheel translates the stem up or down. Stem 16 passes through a yoke 17 which is also of conventional construction but which is welded to the top of valve bonnet 18 as at 19. Annular weld 20 is utilized to attach valve bonnet 18 to valve housing 21, into which the pipe ends 22—23 extend, each pipe end being secured to the housing by two annular welds 24—25.

To the extent required by fabricating convenience, the valve housing itself may be made by assembling castings, forging, or stampings and securing them together by welding. Neither the over-all shape of the valve housing nor its method of fabrication are critical but for the purpose of reducing possible leakage to minimum the all-welded structure is preferable, and the novel valve gate of this invention is particularly intended to compensate for latent distortion which is quite apt to occur in valve structures. The pipe ends and the housing may be subjected to considerable stress by the weight of adjacent piping or by thermal expansion of the pipe line which tends to misalign and warp the valve seats. Such alignment and similar disalignment which might result from warpage, metal creepage or relief of internal metal stresses are compensated for by the structure of the valve gate as subsequently described.

As disclosed in the drawing, the valve gate core or connector piece or central member 26 is attached to the stem 16 by suitable means, such as a threaded connection and pin 27. The valve gate core is provided with two circular stubs 28 which project from each side of it. About each stub is an annular disc seat 29 on which is disposed an annular disc 30 which is secured to the stub by means of annular welds 31. The disc seats do not extend outwardly any substantial distance, and there is clearance between the discs and the valve gate core both at the rims 32 of the discs and inwardly to the disc seats. This clearance permits movement of the disc rims relative to the core, each portion of the rim of each disc being subjected to equal pressure due to the attachment of the discs to the valve gate core at their centers.

The discs shown in Figure 1 are of uniform thickness throughout, except as the rims themselves may be ground to provide planar surfaces. The discs may be fabricated from plate metal of uniform thickness, by forging or other metal deforming operations to provide cupping to whatever extent may be desired. The annular discs are fabricated from metal which is not brittle but which will yield or flex responsively to the pressure exerted by the valve gate operating mechanism or handwheel. While the cupping may not be strictly necessary as a matter of geometric theory, it is desirable in practice in order to provide each disc with a discreet rim which is ground to engage its cooperating valve seat, without a resultant annular depression at the rims which would make the centers higher than the rims. The discs are centrally supported by the valve gate core so that the entire rim of each disc is definitely spaced from the valve gate core and each portion of the rim of each disc is equally free to flex with, or articulate in relation to, the portion of the valve seat which it engages. The valve closing pressure is transmitted first to the valve gate core or connector piece and through it to the centers of the discs so that the force or leverage is exerted equally to all portions of the rims of the discs.

The faces of the rims of the discs are machined or ground to mate with the valve seats at the time the valves are fabricated, and the rim of each disc comprises an annular planar surface of greater diameter than that of each valve seat so that the discs may slide downwardly between the valve seats in face to face engagement with them. Thus, the valve may be closed by manipulation of the hand wheel until full engagement of the disc rims and valve seats is accomplished over the full circumference thereof, regardless of minor distortions and misalignments which are apt to develop in a welded valve structure. If desired, a facing material may be applied by fusion welding, spraying or plating to the disc rims which engage the valve seats. This facing may be a very hard material or a corrosion resistant material or, if desired, a softer metal which in use will more readily conform to the idiosyncrasies of the valve seat. In any case, the area of the plane on the disc is greater than the area of the valve seat so that closure may be complete irrespective of the exact position of the gate.

In essence, the invention comprises the construction of a gate valve by mounting two annular discs on stubs which extend outwardly from the opposed faces of a gate valve core which thus becomes the central member of the gate structure and constitutes the connection between the valve sealing discs and the gate closing means. The stubs extend into apertures in the discs which abut the portions of the central member immediately about the stubs and the elements are welded together. The rim of each disc, however, is spaced from the central member so that it is free to articulate in respect to it, to accommodate for valve seat variation. The force exerted in closing the valve is applied to the discs through the central member so that the force is transmitted to the disc centers and hence equally to all parts of the rims of the discs in order to effect full annular engagement of the disc rims with their cooperating annular valve seats. The metal of the discs is so chosen in relation to the disc thickness and in relation to the effective pressure exerted at the disc rims that the discs will flex or yield in resilient fashion (as distinguished from plastic deformation) whereby the valve gate, while a single integral all welded structure, still has the capacity continuously to accommodate itself to valve seat irregularities or misalignments as they may develop during the continuing use of the valve.

I claim:

1. A gate for a gate valve comprising, a pair of spaced metal discs of similar configuration and uniform cross section in radial direction, each disc having a central aperture therein and a connector piece having disc centering stubs projecting outwardly from opposed faces thereof, the said stubs extending substantially within the respective apertures of said discs, opposed facial portions of said connector piece which are annularly adjacent said stubs residing in facial abutment with portions of said respective discs which are annularly adjacent said apertures and the said discs and connector piece being in fluid-tight welded connection, said connector piece having valve stem attachment means intermediate said discs, and said discs having opposed valve seat engaging portions residing substantially outwardly beyond the areas of engagement of the said discs and connector piece, in yieldable relation thereto.

2. A gate for a gate valve comprising, a pair of spaced metal discs of similar configuration and uniform cross section in radial direction, each disc having a central aperture therein, and a connector piece having disc centering stubs projecting outwardly from opposed faces thereof, the said stubs extending substantially within the respective apertures of said discs, opposed facial portions of said connector piece which are annularly adjacent said stubs residing in facial abutment with portions of said respective discs which are annularly adjacent said apertures, and the said discs and connection being in fluid-tight welded connection, the said discs having opposed valve seat engaging portions residing substantially outwardly beyond the areas of engagement of the said discs and connector piece, in yieldable relation thereto, and the said connector piece having valve stem attachment means extending therefrom intermediate said discs and in spaced relationship thereto, whereby normal components of a valve closing force exerted through the valve stem attachment means are substantially uniformly distributed to the said opposed valve seat engaging surfaces through the centralized connector piece.

FRED C. FANTZ.

References Cited in the file of this patent

UNITED STATES PATENTS

| Number | Name | Date |
| --- | --- | --- |
| 707,825 | Coffin | Aug. 26, 1902 |
| 1,293,874 | Murray | Feb. 11, 1919 |
| 2,562,285 | Timmer | July 31, 1951 |

FOREIGN PATENTS

| Number | Country | Date |
| --- | --- | --- |
| 2,586 | Great Britain | of 1884 |